US012806940B2

(12) United States Patent
Shimizu

(10) Patent No.: US 12,806,940 B2
(45) Date of Patent: Nov. 24, 2026

(54) PNEUMATIC TIRE

(71) Applicant: The Yokohama Rubber Co., LTD., Tokyo (JP)

(72) Inventor: Tsuyoto Shimizu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 228 days.

(21) Appl. No.: 17/754,501

(22) PCT Filed: Oct. 7, 2020

(86) PCT No.: PCT/JP2020/038042

§ 371 (c)(1),
(2) Date: Apr. 4, 2022

(87) PCT Pub. No.: WO2021/070876

PCT Pub. Date: Apr. 15, 2021

(65) Prior Publication Data

US 2023/0241931 A1 Aug. 3, 2023

(30) Foreign Application Priority Data

Oct. 8, 2019 (JP) ................................ 2019-185418

(51) Int. Cl.
*B60C 13/02* (2006.01)

(52) U.S. Cl.
CPC .................................... *B60C 13/02* (2013.01)

(58) Field of Classification Search
CPC ..... B60C 13/001; B60C 13/002; B60C 13/02; B60C 13/023
See application file for complete search history.

(56) References Cited

U.S. PATENT DOCUMENTS

2001/0002604 A1* 6/2001 Ikeda .................... B60C 13/001 152/523
2011/0139326 A1 6/2011 Nukushina

FOREIGN PATENT DOCUMENTS

| | | | |
|---|---|---|---|
| DE | 10 2010 061 740 | A1 | 6/2011 |
| EP | 2255979 | * | 12/2010 |
| EP | 3 594 024 | B1 | 3/2021 |
| JP | 2000-255224 | | 9/2000 |
| JP | 3422715 | B2 | 6/2003 |
| JP | 2005-053248 | | 3/2005 |
| JP | 4371625 | B2 | 11/2009 |
| JP | 2011-105231 | A | 6/2011 |
| JP | 2011-148338 | A | 8/2011 |
| JP | 2011-255803 | A | 12/2011 |
| JP | 2013-129233 | A | 7/2013 |
| JP | 2014-61820 | A | 4/2014 |

(Continued)

*Primary Examiner* — Justin R Fischer
(74) *Attorney, Agent, or Firm* — Thorpe North & Western

(57) ABSTRACT

A pneumatic tire includes a tread portion, a tire side portion, and a bead portion and includes a ridge region in a predetermined region of the tire side portion. The ridge region is formed with a plurality of ridges arranged. The plurality of ridges periodically protrudes from a base surface in parallel to one another. A pitch length between the ridges that are adjacent in a cross-sectional view of the plurality of ridges along an orthogonal direction, which is a direction orthogonal to an extension direction, is 0.52 mm or more and 1.50 mm or less. A ratio of a height to a width of one of the ridges along the orthogonal direction is 0.60 or more and 1.40 or less.

17 Claims, 8 Drawing Sheets

(56) References Cited

FOREIGN PATENT DOCUMENTS

| | | | | |
|---|---|---|---|---|
| JP | 2014-223914 | A | | 12/2014 |
| JP | 2016-523763 | A | | 8/2016 |
| JP | 2017-7506 | A | | 1/2017 |
| JP | 2017-65383 | A | | 4/2017 |
| JP | 2017-210132 | A | | 11/2017 |
| JP | 2019081510 | | * | 5/2019 |

* cited by examiner

PNEUMATIC TIRE

TECHNICAL FIELD

The present technology relates to a pneumatic tire.

BACKGROUND ART

An indicator of a brand or the like may be attached to a tire side portion of a pneumatic tire. Japan Patent No. 3422715 describes a pneumatic tire in which the visibility of a decorative portion provided on a sidewall portion is enhanced. Japan Patent No. 4371625 describes a pneumatic tire in which a ridge is provided on a sidewall portion to suppress deterioration of appearance due to cracks occurring on a rubber surface.

Tire wax (hereinafter referred to as wax) is sometimes applied to the tire side portion. Wax is applied to protect and polish the tire side portions. The wax applied to the tire side portions comes off due to wind and rain, reducing the protecting and polishing effects overtime. For this reason, routinely reapplying the wax is necessary.

The pneumatic tires according to Japan Patent Nos. 3422715 and have room for improvement in making it difficult for the applied wax to come off. There is also room for improvement in enhancing the persistence of the effect of the applied wax.

SUMMARY

The present technology has been made in view of the foregoing, and provides a pneumatic tire that provides the enhanced persistence of the effect of the applied wax by suppressing the applied wax coming off.

A pneumatic tire according to an embodiment of the present technology includes a tread portion, a tire side portion, and a bead portion and includes a ridge region in a predetermined region of the tire side portion. The ridge region is formed with a plurality of ridges arranged. The plurality of ridges periodically protrudes from a base surface in parallel to each other. A pitch length between the ridges that are adjacent in a cross-sectional view of the plurality of ridges along an orthogonal direction, which is a direction orthogonal to an extension direction, is 0.52 mm or more and 1.50 mm or less. A ratio of a height to a width of one of the ridges along the orthogonal direction is 0.60 or more and 1.40 or less.

Preferably, the height of the one of the ridges is 0.50 mm or more and 1.00 mm or less.

Preferably, top portions of the plurality of ridges each include a flat surface portion, and a ratio of a width of the flat surface portion of each of the top portions along the orthogonal direction to the pitch length is 0.10 or more and 0.30 or less.

Preferably, a flat portion is provided between the ridges that are adjacent in a cross-sectional view of the plurality of ridges along the orthogonal direction, and a ratio of a width of the flat portion along the orthogonal direction to the pitch length is 0 or more and 0.20 or less.

Preferably, the ridges each include a wall surface from the top portion toward the flat portion, and an angle of the wall surface with respect to a perpendicular line drawn from a tire profile line toward the base surface in a cross-sectional view along the orthogonal direction is 150 or less.

Preferably, one end portion of the plurality of ridges in the extension direction is in contact with a wall portion, a height of the wall portion is greater than a height of each of the plurality of ridges, and a difference between the height of each of the plurality of ridges and the height of the wall portion is 0.20 mm or more.

Preferably, a ratio of a length along a contour of the ridge per cycle in a cross-sectional view of the plurality of ridges along the orthogonal direction to the pitch length is 2.0 or more and 3.0 or less.

Preferably, the ridge region is located on an outer side in a tire radial direction from a tire maximum width position, and a ratio of a continuous extension length of the plurality of ridges in the tire radial direction to a tire cross-sectional height is 0.2 or more.

Preferably, an angle of each of the plurality of ridges in the extension direction with respect to the tire radial direction is 00 or more and 58° or less.

According to the present technology, the durability of the tire wax can be maintained without lowering the coatability of the tire wax.

DETAILED DESCRIPTION

Embodiments of the present technology are described in detail below with reference to the drawings. In the embodiments described below, components identical or substantially similar to those of other embodiments have identical reference signs, and descriptions of the components will be simplified or omitted. The present technology is not limited by each embodiment. In addition, constituents of each embodiment include constituents that can be easily substituted by one skilled in the art or constituents that are substantially identical. Further, the configurations described below may be combined as desired. Moreover, various omissions, substitutions, and changes to the configurations can be carried out within the scope of the present technology.

Pneumatic Tire

Figure 1:
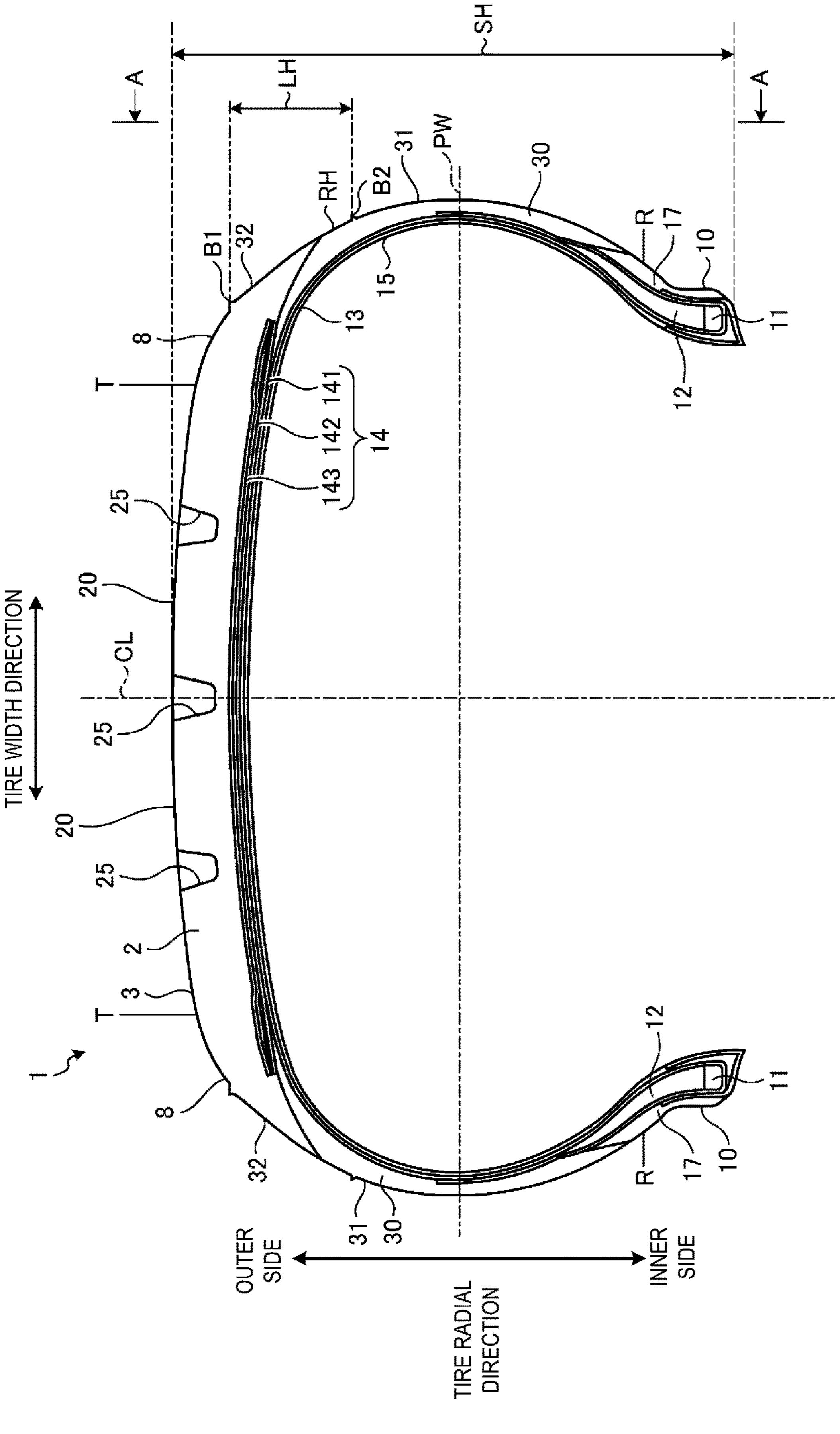
FIG. 1 is a meridian cross-sectional view illustrating a main portion of a pneumatic tire according to an embodiment of the present technology.

FIG. 1 is a meridian cross-sectional view illustrating a main portion of a pneumatic tire according to an embodiment of the present technology. In the pneumatic tire 1 illustrated in FIG. 1, a tread portion 2 is disposed at the outermost portion in the tire radial direction when viewed in a meridian cross-section. The surface of the tread portion 2, that is, the portion that comes into contact with the road surface during traveling of a vehicle with the pneumatic tires 1 mounted (not illustrated), includes a tread surface 3. A plurality of circumferential main grooves 25 extending in the tire circumferential direction are formed in the tread surface 3. A plurality of land portions 20 are defined in the tread surface 3 by the circumferential main grooves 25. A groove other than the circumferential main grooves 25 may be formed in the tread surface 3. For example, a lug groove extending in the tire width direction (not illustrated) a narrow groove different from the circumferential main grooves 25 (not illustrated), or the like may be formed in the tread surface 3.

Shoulder portions 8 are located at both ends of the tread portion 2 in the tire width direction. Sidewall portions 30 are disposed on an inner side of the shoulder portion 8 in the tire radial direction. The sidewall portions 30 are disposed at two locations on both sides of the pneumatic tire 1 in the tire width direction. The surfaces of the sidewall portions 30 are formed as tire side portions 31. The tire side portions 31 are located on both sides in the tire width direction. The tire side portions 31 at two locations each face an opposite side of a side in the tire width direction where the tire equatorial plane CL is located.

The tire side portion 31 in this case refers to a uniformly continuous surface in a range of the outer side from a ground contact edge T of the tread portion 2 in the tire width direction and the outer side from a rim check line R in the tire radial direction. Further, the ground contact edge T refers to both outermost edges in the tire width direction and is continuous in the tire circumferential direction in a region in which the tread surface 3 of the tread portion 2 of the pneumatic tire 1 contacts the road surface with the pneumatic tire 1 when the pneumatic tire 1 is mounted on a regular rim, the regular internal pressure is inflated, and 70% of the regular load is applied. Moreover, the rim check line R refers to a line for confirming whether the tire is normally mounted and is typically indicated on a front side surface of bead portions 10 as a continuous annular convex line in the tire circumferential direction along a portion approximate to a rim flange (not illustrated) on the outer side in the tire radial direction from the rim flange.

The non-ground contact region of the connection portion between the profile of the tread portion 2 and the profile of the sidewall portion 30 is called a buttress portion. A buttress portion 32 constitutes a side wall surface on an outer side of the shoulder portion 8 in the tire width direction.

Note that the regular rim refers to an "applicable rim" specified by Japan Automobile Tyre Manufacturers Association (JATMA), a "Design Rim" specified by TRA (The Tire and Rim Association, Inc.), or a "Measuring Rim" specified by ETRTO (The European Tyre and Rim Technical Organisation). Additionally, the regular internal pressure refers to a "maximum air pressure" specified by JATMA, a maximum value of "TIRE LOAD LIMITS AT VARIOUS COLD INFLATION PRESSURES" specified by TRA, or "INFLATION PRESSURES" specified by ETRTO. Additionally, the regular load refers to a "maximum load capacity" specified by JATMA, a maximum value in "TIRE LOAD LIMITS AT VARIOUS COLD INFLATION PRESSURES" specified by TRA, or "LOAD CAPACITY" specified by ETRTO.

The bead portion 10 is located on an inner side of each of the sidewall portions 30 in the tire radial direction located on both sides in the tire width direction. The bead portions 10 are disposed at two locations on both sides of the tire equatorial plane CL, similarly to the sidewall portions 30. The bead portions 10 are each provided with a bead core 11, and a bead filler 12 is provided on an outer side of the bead core 11 in the tire radial direction.

A plurality of belt layers 14 is provided on an inner side of the tread portion 2 in the tire radial direction. The belt layers 14 include a plurality of cross belts 141, 142, and a belt cover 143 in a multilayer structure. Of these, the cross belts 141 and 142 are formed by performing a rolling process on a plurality of coating rubber-covered belt cords made of steel or an organic fiber material. The cross belts 141 and 142 have a belt angle of 20° or more and 55° or less in absolute value. Furthermore, the plurality of cross belts 141 and 142 has different belt cords, which are defined as inclination angles in the fiber direction of the belt cords with respect to the tire circumferential direction, and is formed as a so-called crossply structure in which the belt cords are intersected each other in the fiber direction and layered. The belt cover 143 is formed by performing a rolling process on coating rubber-covered steel or a plurality of cords made of an organic fiber material. The belt cover 143 has a belt angle of 0° or more and 10° or less in absolute value. The belt cover 143 is disposed in a multilayer manner on an outer side of the cross belts 141 and 142 in the tire radial direction.

A carcass 13 containing a cord of a radial ply is continuously provided on an inner side of the belt layer 14 in the tire radial direction and on the sidewall portions 30 on the side of the tire equatorial plane CL. The carcass 13 has a single layer structure made of one carcass ply or a multilayer structure with a plurality of carcass plies layered and forms the backbone of the tire extending in a toroidal manner between the bead cores 11 disposed on both sides in the tire width direction. Specifically, the carcass 13 is disposed extending from one bead portion 10 to the other bead portion 10 among the bead portions 10 located on both sides in the tire width direction and turns back toward the outer side in the tire width direction along the bead cores 11 at the bead portions 10 to wrap around the bead cores 11 and the bead fillers 12. The carcass ply of the carcass 13 is formed by performing a rolling process on a plurality of coating rubber-covered carcass cords made of steel or an organic fiber material, such as aramid, nylon, polyester, rayon, and the like. The carcass ply has a carcass angle, which is an inclination angle of the fiber direction of the carcass cords with respect to the tire circumferential direction, of 80° or more and 95° or less in absolute value.

At the bead portion 10, a rim cushion rubber 17 that forms a contact surface of the bead portion 10 with respect to the rim flange is disposed on the inner side in the tire radial direction and the outer side in the tire width direction of the bead core 11 and a turned back portion of the carcass 13. Additionally, an innerliner 15 is formed along the carcass 13 on an inner side of the carcass 13 or on an inner portion side of the carcass 13 in the pneumatic tire 1.

Ridge Region

In FIG. 1, the pneumatic tire 1 includes a protrusion portion B1 and a protrusion portion B2 on the buttress portion 32. A ridge region RH is defined between the protrusion portion B1 and the protrusion portion B2. The ridge region RH includes a plurality of ridges extending continuously in the tire radial direction. The ridge region RH is located on an outer side of a maximum width position PW of the pneumatic tire 1 in the tire radial direction. The ridge region RH is formed with a plurality of ridges arranged as described later, and the plurality of ridges are periodically arranged parallel to each other. A ratio LH/SH of a length LH in the tire radial direction in the range of the ridge region RH in the tire radial direction to a tire cross-sectional height SH is 0.2 or more. The ratio LH/SH is preferably 0.3 or more, more preferably 0.4 or more, and further preferably 0.5 or more. As the range of the ridge region RH in the tire radial direction is longer, the wax is easily applied, and the applied wax is more difficult to peel off.

Figure 2:
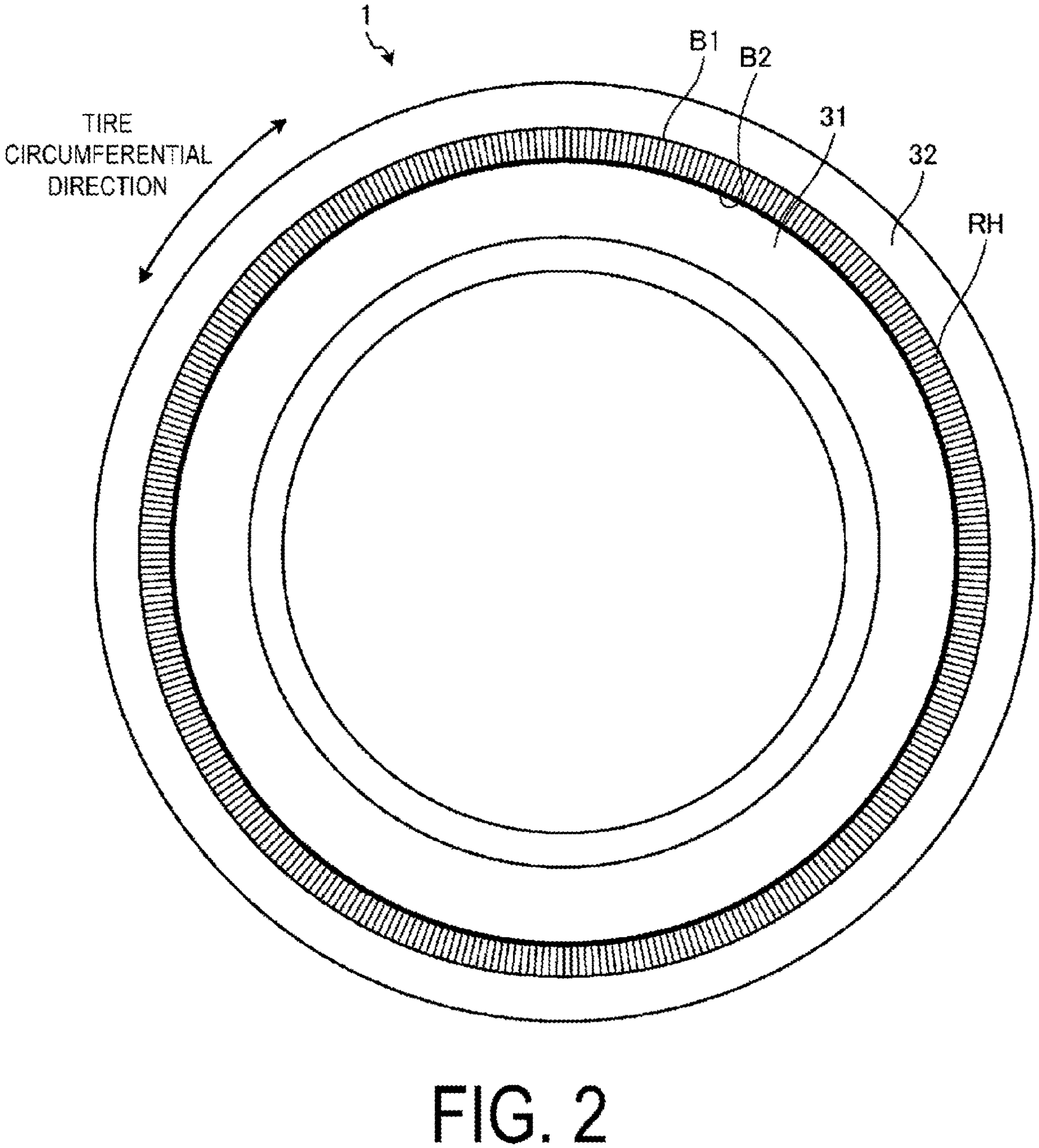
FIG. 2 is a side view of a pneumatic tire according to an embodiment of the present technology.

FIG. 2 is a side view of the pneumatic tire 1 according to an embodiment of the present technology. FIG. 2 is a side view of the pneumatic tire 1 including the view taken along line A-A in the direction of the arrows of FIG. 1. In FIG. 2, the ridge region RH is provided on the tire side portion 31.

The tire side portion 31 sometimes provides a decorative portion for improving the appearance of the pneumatic tire 1 and displaying various kinds of information. The decorative portion is a region different from the ridge region RH. The decorative portion sometimes includes various kinds of information for identifying the pneumatic tire 1 or displaying such information to users, such as a brand name, a logo mark, or a product name.

Ridge Shape

Figure 3:
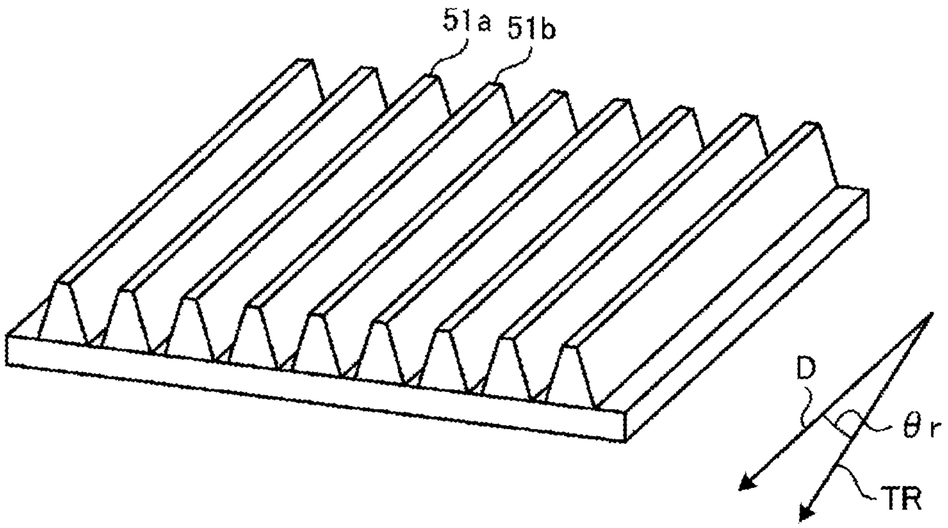
FIG. 3 is a diagram illustrating an example of a ridge provided in a ridge region in FIG. 2.

FIG. 3 is a diagram illustrating an example of a ridge provided in the ridge region RH in FIG. 2. FIG. 3 is an enlarged perspective view illustrating a portion of the ridge provided in the ridge region RH in FIG. 2. Referring to FIG. 3, a plurality of ridges 51*a*. 51*b*, 51*c*, and the like extends in the same direction and periodically protrudes from the base surface in parallel to each other. "Parallel" means that they are provided side by side without intersecting each other.

The direction (hereinafter, appropriately referred to as extension direction) D in which the plurality of ridges 51*a*, 51*b*, 51*c*, and the like extend may coincide with the tire radial direction TR or may be different from the tire radial direction TR. The angle θr between the extension direction D and the tire radial direction TR is preferably 0° or more and 58° or less. The extension direction D of each of the ridges 51*a*, 51*b*, 51*c*, and the like is preferably oriented in the tire radial direction as much as possible. When the angle θr is outside the range of 0° or more and 58° or less, it is difficult to apply the wax and the applied wax easily peels off, which is not preferable. Note that the angle θr is preferably 0° or more and 580 or less for both the angles on both sides with respect to the extension direction D, that is, the clockwise angle and the counterclockwise angle. That is, the angle θr is preferably −58° or more and or less with respect to the extension direction D.

Figure 4:
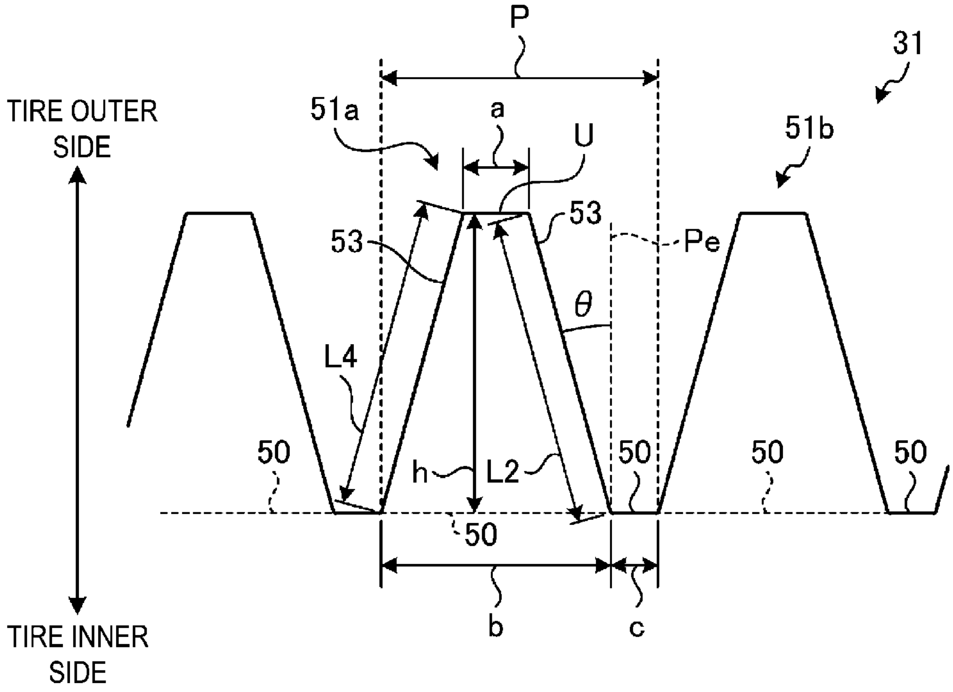
FIG. 4 is a cross-sectional view taken along a direction orthogonal to an extension direction of the ridge.

FIG. 4 is a cross-sectional view of the ridge taken along a direction orthogonal to the extension direction. FIG. 4 is a cross-sectional view illustrating an example of the ridges 51*a* and 51*b* that are adjacent (hereinafter, both may be collectively referred to as ridge 51).

In FIG. 4, the ridge 51 protrudes toward a tire outer side from a base surface 50. The ridge 51 has a mountain ridge-like convex shape and extends along the tire side portion 31. The ridge 51 is substantially trapezoidal in a cross-sectional view along a direction orthogonal to the extension direction. The substantially trapezoidal shape is a shape including a flat portion having no unevenness on the upper base, that is, a top portion U. When at least a portion of the top portion U is a flat portion with no unevenness, such a shape may be considered as the substantially trapezoidal shape, and the entire top portion U does not need to be a flat portion with no unevenness.

The base surface 50 is a surface recessed from a profile line (not illustrated) toward a tire cavity side. The profile line is a contour line that smoothly connects the buttress portion 32 and the bead portion 10 in a tire meridian cross-section illustrated in FIG. 1. A profile line is composed of a single arc or a plurality of arcs. A profile line is defined excluding partial unevenness. The buttress portion 32 is a non-ground contact region of the connection portion between the profile of the tread portion 2 and the profile of the sidewall portion, and constitutes a side wall surface on the outer side of the shoulder portion 8 in the tire width direction.

Here, a length along the contour of the ridge per cycle in the cross-sectional view of the plurality of ridges 51*a* and 51*b* along the direction orthogonal to the extension direction is defined as Lr. The length Lr is the periphery length along the contour of the ridge 51 per cycle of the plurality of ridges 51 in the cross-sectional view of the plurality of ridges 51 along the direction orthogonal to the extension direction. When the ridge 51*a* is focused on, the length Lr is the total length of the width c of the base surface, the length L2 of the wall surface 53, the width a of the top portion U, and the length L4 of the wall surface 53.

At this time, the ratio Lr/P of the length Lr to the length P is preferably 2.0 or more and 3.0 or less. If the ratio Lr/P is less than 2.0, it is difficult to apply the wax, whereas if the ratio Lr/P exceeds 3.0, the applied wax easily peels off by an external impact, which is not preferable.

Further, the length of one cycle of the plurality of ridges 51*a* and 51*b* along the base surface 50, that is, one pitch between the ridges that are adjacent in a cross-sectional view of the ridges along a direction orthogonal to the extension direction is defined as P. The pitch length P is preferably 0.52 mm or more and 1.50 mm or less, and more preferably 0.55 mm or more and 1.50 mm or less. If the pitch length P is outside this range, it is difficult to apply the wax, and the applied wax easily peels off, which is not preferable.

Ridge Height, Etc.

The ratio h/b of the height h of the ridge to the width b of one ridge 51 along the direction orthogonal to the extension direction of the ridges is preferably 0.60 or more and 1.40 or less. If the ratio h/b is less than 0.60, the wax cannot be protected from an external impact, and the reflection of light cannot be suppressed, which is not preferable. If the ratio h/b exceeds 1.40, the permeation of the wax between the ridges becomes slow and the coatability degrades, which is not preferable.

The height h of one ridge 51 is preferably 0.50 mm or more and 1.00 mm or less. If the height h is less than 0.50 mm, water or the like easily enters between the ridges, the wax cannot be protected, and the reflection of light cannot be suppressed, which is not preferable. If the height h exceeds 1.00 mm, the ridge easily falls down and the wax easily peels off, which is not preferable.

Preferably, the top portion U of each of the plurality of ridges includes a flat surface portion, and the ratio a/P of the width a of the flat surface portion to the pitch length P along the direction orthogonal to the extension direction of the ridges is 0.10 or more and 0.30 or less. If the ratio a/P is less than 0.10, the ridge 51 easily falls down due to an external impact, and the wax easily peels off, which is not preferable. If the ratio a/P exceeds 0.30, the contact area with an exterior increases, and the wax easily peels off, which is not preferable. It is desirable that the width a of the flat surface portion of the top portion U be as small as possible. However, the lower limit of the width a is 0.2 mm due to limitation of a tool for producing a mold. Therefore, the lower limit of the ratio a/P is 0.10. The top portion U is located at the outermost of the ridge 51 with respect to the base surface 50.

Preferably, in the cross-sectional view of a plurality of ridges along the direction orthogonal to the extension direction of the ridges, the base surface 50, which is a flat portion, is provided between the ridges that are adjacent, and the ratio c/P of the width c of the base surface 50 to the pitch length P along the direction orthogonal to the extension direction of the ridges is 0 or more and 0.20 or less. When the ratio c/P exceeds 0.20, the wax easily peels off by water entering between the ridges, which is not preferable. Further, when the ratio c/P exceeds 0.20, the base surface 50, which is a flat portion, reflects light, which is not preferable.

The ridge 51 includes a wall surface 53 from the top portion U toward the base surface 50, which is a flat portion. In the cross-sectional view of the ridges along the direction orthogonal to the extension direction, the angle θ of the wall surface 53 with respect to the perpendicular line Pe drawn from the profile line of the tire toward the base surface 50 is preferably 150 or less. The smaller the angle θ, the more the wax separation from the wall surface due to the external impact can be suppressed. Further, the smaller the angle θ, the more the reflection of light can be suppressed.

Ridge End Portion

Figure 5:
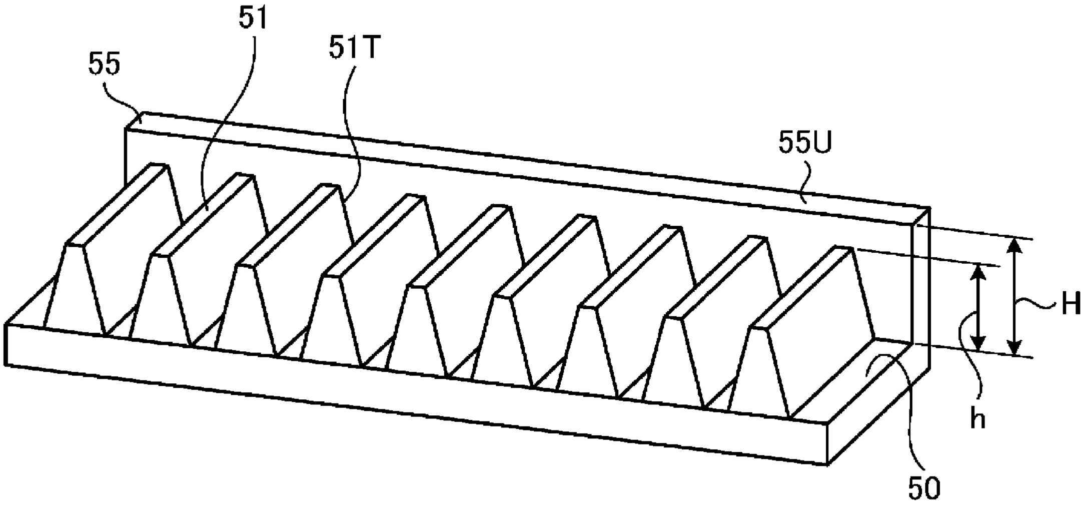
FIG. 5 is a perspective view illustrating end portions of a plurality of ridges in an extension direction.

FIG. 5 is a perspective view illustrating the end portions of the plurality of ridges 51 in the extension direction. FIG. 5 illustrates the end portions of a plurality of ridges 51 at an enlarged scale. As illustrated in FIG. 5, the end portions 51T of the plurality of ridges 51 in the extension direction are in contact with the wall portion 55 that protrudes from the base surface 50. The wall portion 55 may be the protrusion portion B1 or the protrusion portion B2 in FIG. 1 or may be another wall portion. The height H of the wall portion 55 is greater than the height h of the plurality of ridges 51. The difference between the height h of each of the plurality of ridges 51 and the height H of the wall portion 55 is preferably 0.20 mm or more. When the difference between the height h and the height H is 0.20 mm or more, it is possible to prevent water from flowing between the ridges 51. In addition, a shadow can be cast between the ridges 51 to improve visibility. The top portion U of the wall portion 55 is not provided with a ridge and is a flat surface.

Modified Examples

Figure 6:
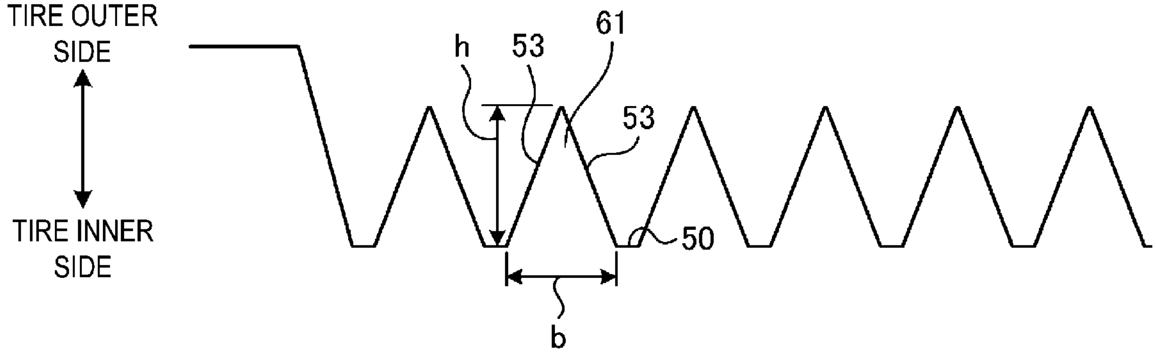
FIG. 6 is a cross-sectional view illustrating a modified example of the ridge.
Figure 7:
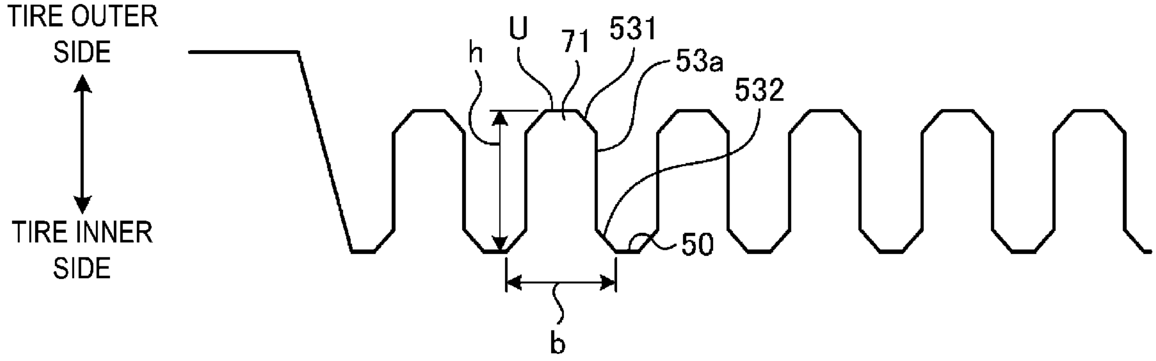
FIG. 7 is a cross-sectional view illustrating a modified example of the ridge.
Figure 8:
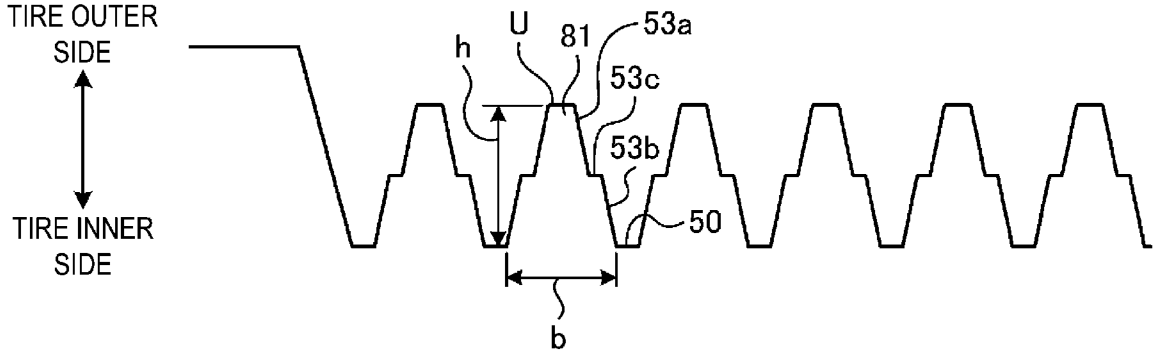
FIG. 8 is a cross-sectional view illustrating a modified example of the ridge.

FIGS. 6 to 8 are cross-sectional views illustrating a modified example of the ridge. FIGS. 6 to 8 are cross-sectional views taken along a direction orthogonal to the extension direction of the ridge.

A ridge 61 illustrated in FIG. 6 includes no flat portion at its top portion and has a triangular cross-sectional shape. A ridge 71 illustrated in FIG. 7 has a top portion U with a flat portion. A wall surface 53*a* is provided between the top portion U of the ridge 71 and the base surface 50. The ridge 71 includes an inclined surface 531 between the top portion U and the wall surface 53*a*. The ridge 71 includes an inclined surface 532 between the base surface 50 and the wall surface 53*a*. A ridge 81 illustrated in FIG. 8 has a top portion U with a flat portion. The ridge 81 includes wall surfaces 53*a* and 53*b* between the top portion U and the base surface 50. The ridge 81 includes a step portion 53*c* between the wall surface 53*a* and the wall surface 53*b*.

Also in the cases illustrated in FIGS. 6 to 8, the ratio h/b is preferably 0.60 or more and 1.40 or less. If the ratio h/b is less than 0.60, the wax cannot be protected from an external impact and the reflection of light cannot be suppressed, which is not preferable. If the ratio h/b exceeds 1.40, the permeation of the wax between the ridges becomes slow and the coatability degrades, which is not preferable.

Inner and Outer Surfaces with Respect to a Vehicle

Each of the ridges may be provided on both the inner surface (hereinafter referred to as the vehicle inner surface) and the outer surface of the pneumatic tire 1 in the mounting direction with respect to the vehicle. In particular, wax is not easily reapplied to the vehicle inner surface with the pneumatic tire 1 mounted on the vehicle. In this respect, the pneumatic tire 1 provides enhanced durability of the wax and has a beneficial effect.

The pneumatic tire 1 includes a mounting direction indicator (not illustrated) that indicates the mounting direction with respect to the vehicle. The mounting direction indicator, for example, is composed of a mark or unevenness on a sidewall portion of the tire. For example, Economic Commission for Europe Regulation, Article 30 (ECER30) requires that a mounting direction indicator portion be provided on the sidewall portion on the outer side in the vehicle width direction with the tire mounted on a vehicle.

EXAMPLES

In this example, tests for wax coatability and wax durability were performed on a plurality of types of pneumatic tires of different conditions (see Tables 1 to 5). In these tests, pneumatic tires of 255/35ZR19(96Y) 19x9J were assembled on a regular rim and inflated to a specified air pressure.

Regarding the wax coatability, the time required from the start to the completion of the work of applying the water-based tire wax to the pneumatic tire 1 was expressed as index values. A state where the tire wax has been uniformly applied is judged as the completion of the work. Larger values indicate faster completion of the work and superior coatability.

Regarding the wax durability, the pneumatic tire 1 was coated with water-based tire wax containing a red colorant, mounted on a regular rim and exposed to sunlight and wind and rain under an internal pressure of 230 kPa at an outdoor exposure test site, and the residual degree of wax one month later was visually evaluated and expressed as index values. The larger values indicate the higher durability of the wax.

In the pneumatic tires of Examples 1 to 37 illustrated in Tables 1 to 5, the ridge pitch length P is 0.52 mm or more and 1.50 mm or less or is outside this range, the ridge height h is 0.50 mm or more and 1.00 mm or less or is outside this range, the ratio h/b is 0.60 or more and 1.40 or less or is outside this range, the ratio a/P is 0.10 or more and 0.30 or less or is outside this range, the ratio c/P is 0 or more and 0.20 or less or is outside this range, the ridge wall angle θ is 15° or less or is outside this range, the height difference H-h is 0.20 mm or more or is outside this range, the ratio Lr/P is 2.0 or more and 3.0 or less or is outside this range, the ratio LH/SH is 0.2 or more or is outside this range, and the angle θr between the ridge extension direction D and the tire radial direction TR is 0° or more and 58° or less or is outside this range.

In the tire of Conventional Example in Table 1, the ridge pitch length P is 0.50 mm, the ridge height h is 0.15 mm, the ratio h/b is 0.32, the ratio a/P is 0.60, the ratio c/P is 0.05, the ridge wall angle θ is 30°, the height difference H-h is 0.35 mm, the ratio Lr/P is 1.35, the ratio LH/SH is 0.30, and the angle θr between the ridge extension direction D and the tire radial direction TR is 0°.

In the tire of Comparative Example 1 in Table 1, the ridge pitch length P is 0.50 mm, the ridge height h is 0.50 mm, the ratio h/b is 1.19, the ratio a/P is 0.30, the ratio c/P is 0.16, the ridge wall angle θ is 15°, the height difference H-h is 0.20 mm, the ratio Lr/P is 2.53, the ratio LH/SH is 0.30, and the angle θr between the ridge extension direction D and the tire radial direction TR is 0°.

In the tire of Comparative Example 2 in Table 1, the ridge pitch length P is 1.55 mm, the ridge height h is 0.60 mm, the ratio h/b is 1.28, the ratio a/P is 0.10, the ratio c/P is 0.70, the ridge wall angle θ is 15°, the height difference H-h is 0.20 mm, the ratio Lr/P is 1.59, the ratio LH/SH is 0.30, and the angle θr between the ridge extension direction D and the tire radial direction TR is 00.

In the tire of Comparative Example 3 in Table 1, the ridge pitch length P is 1.40 mm, the ridge height h is 0.60 mm, the ratio h/b is 0.59, the ratio a/P is 0.23, the ratio c/P is 0.28, the ridge wall angle θ is 30°, the height difference H-h is 0.20 mm, the ratio Lr/P is 1.49, the ratio LH/SH is 0.30, and the angle θr between the ridge extension direction D and the tire radial direction TR is 0°.

In the tire of Comparative Example 4 in Table 1, the ridge pitch length P is 1.40 mm, the ridge height h is 0.60 mm, the ratio h/b is 1.43, the ratio a/P is 0.07, the ratio c/P is 0.70, the ridge wall angle θ is 15°, the height difference H-h is 0.20 mm, the ratio Lr/P is 1.66, the ratio LH/SH is 0.30, and the angle θr between the ridge extension direction D and the tire radial direction TR is 0°.

Referring to Tables 1 to 5, it can be seen that favorable results are obtained when the ridge pitch length P is 0.52 mm or more and 1.50 mm or less, when the ridge height h is 0.50 mm or more and 1.00 mm or less, when the ratio h/b is 0.60 or more and 1.40 or less, when the ratio a/P is 0.10 or more and 0.30 or less, when the ratio c/P is 0 or more and 0.20 or less, when the ridge wall angle θ is 15° or less, when the height difference H-h is 0.20 mm or more, when the ratio Lr/P is 2.0 or more and 3.0 or less, when the ratio LH/SH is 0.2 or more, and when the angle θr between the ridge extension direction D and the tire radial direction TR is 0° or more and 58° or less.

TABLE 1

| | Conventional Example | Comparative Example 1 | Example 1 | Example 2 |
|---|---|---|---|---|
| Ridge pitch length P (mm) | 0.50 | 0.50 | 0.55 | 0.60 |
| Ridge height h (mm) | 0.15 | 0.50 | 0.60 | 0.60 |
| Ratio h/b | 0.32 | 1.19 | 1.28 | 1.28 |
| Ratio a/P | 0.60 | 0.30 | 0.27 | 0.25 |
| Ratio c/P | 0.05 | 0.16 | 0.14 | 0.21 |
| Ridge wall angle θ (°) | 30 | 15 | 15 | 15 |
| H-h (mm) | 0.35 | 0.20 | 0.20 | 0.20 |
| Ratio Lr/P | 1.35 | 2.53 | 2.67 | 2.53 |
| Ratio LH/SH | 0.30 | 0.30 | 0.30 | 0.30 |
| Angle θr (°) | 0 | 0 | 0 | 0 |
| Wax coatability | 100 | 95 | 100 | 100 |
| Wax durability | 100 | 120 | 120 | 119 |

| | Example 3 | Example 4 | Example 5 | Example 6 | Example 7 |
|---|---|---|---|---|---|
| Ridge pitch length P (mm) | 0.70 | 0.90 | 1.00 | 1.20 | 1.30 |
| Ridge height h (mm) | 0.60 | 0.60 | 0.60 | 0.60 | 0.60 |
| Ratio h/b | 1.28 | 1.28 | 1.28 | 1.28 | 1.28 |
| Ratio a/P | 0.21 | 0.17 | 0.15 | 0.13 | 0.12 |
| Ratio c/P | 0.33 | 0.48 | 0.53 | 0.61 | 0.64 |
| Ridge wall angle θ (°) | 15 | 15 | 15 | 15 | 15 |
| H-h (mm) | 0.20 | 0.20 | 0.20 | 0.20 | 0.20 |
| Ratio Lr/P | 2.32 | 2.02 | 1.92 | 1.77 | 1.71 |
| Ratio LH/SH | 0.30 | 0.30 | 0.30 | 0.30 | 0.30 |
| Angle θr (°) | 0 | 0 | 0 | 0 | 0 |
| Wax coatability | 100 | 100 | 100 | 100 | 100 |
| Wax durability | 117 | 114 | 113 | 111 | 111 |

TABLE 2

| | Example 8 | Comparative Example 2 | Comparative Example 3 | Example 9 |
|---|---|---|---|---|
| Ridge pitch length P (mm) | 1.50 | 1.55 | 1.40 | 1.40 |
| Ridge height h (mm) | 0.60 | 0.60 | 0.60 | 0.60 |
| Ratio h/b | 1.28 | 1.28 | 0.59 | 0.60 |
| Ratio a/P | 0.10 | 0.10 | 0.23 | 0.22 |
| Ratio c/P | 0.69 | 0.70 | 0.28 | 0.28 |
| Ridge wall angle θ (°) | 15 | 15 | 30 | 30 |
| H-h (mm) | 0.20 | 0.20 | 0.20 | 0.20 |
| Ratio Lr/P | 1.61 | 1.59 | 1.49 | 1.49 |
| Ratio LH/SH | 0.30 | 0.30 | 0.30 | 0.30 |
| Angle θr (°) | 0 | 0 | 0 | 0 |
| Wax coatability | 100 | 100 | 100 | 100 |
| Wax durability | 110 | 95 | 95 | 110 |

TABLE 2-continued

| | Example 10 | Comparative Example 4 | Example 11 | Example 12 |
|---|---|---|---|---|
| Ridge pitch length P (mm) | 1.40 | 1.40 | 1.40 | 1.40 |
| Ridge height h (mm) | 0.60 | 0.60 | 0.45 | 0.50 |
| Ratio h/b | 1.40 | 1.43 | 0.94 | 0.98 |
| Ratio a/P | 0.08 | 0.07 | 0.11 | 0.11 |
| Ratio c/P | 0.69 | 0.70 | 0.66 | 0.63 |
| Ridge wall angle θ (°) | 15 | 15 | 2.0 | 20 |
| H-h (mm) | 0.20 | 0.20 | 0.20 | 0.20 |
| Ratio Lr/P | 1.66 | 1.66 | 1.45 | 1.50 |
| Ratio LH/SH | 0.30 | 0.30 | 0.30 | 0.30 |
| Angle θr (°) | 0 | 0 | 0 | 0 |
| Wax coatability | 100 | 95 | 100 | 100 |
| Wax durability | 110 | 110 | 105 | 110 |

TABLE 3

| | Example 13 | Example 14 | Example 15 | Example 16 |
|---|---|---|---|---|
| Ridge pitch length P (mm) | 1.40 | 1.40 | 1.40 | 1.40 |
| Ridge height h (mm) | 1.00 | 1.05 | 0.60 | 0.60 |
| Ratio h/b | 1.14 | 1.1.5 | 1.36 | 1.30 |
| Ratio a/P | 0.11 | 0.11 | 0.09 | 0.10 |
| Ratio c/P | 0.37 | 0.35 | 0.68 | 0.67 |
| Ridge wall angle θ (°) | 20 | 20 | 15 | 15 |
| H-h (mm) | 0.20 | 0.20 | 0.20 | 0.20 |
| Ratio Lr/P | 2.00 | 2.05 | 1.66 | 1.66 |
| Ratio LH/SH | 0.30 | 0.30 | 0.30 | 0.30 |
| Angle θr (°) | 0 | 0 | 0 | 0 |
| Wax coatability | 100 | 100 | 100 | 100 |
| Wax durability | 120 | 110 | 110 | 120 |

| | Example 17 | Example 18 | Example 19 | Example 20 |
|---|---|---|---|---|
| Ridge pitch length P (mm) | 1.40 | 1.40 | 0.55 | 0.55 |
| Ridge height h (mm) | 0.60 | 0.60 | 0.60 | 0.60 |
| Ratio h/b | 0.81 | 0.79 | 1.36 | 1.40 |
| Ratio a/P | 0.30 | 0.31 | 0.22 | 0.20 |
| Ratio c/P | 0.47 | 0.46 | 0.20 | 0.22 |
| Ridge wall angle θ (°) | 15 | 15 | 15 | 15 |
| H-h (mm) | 0.20 | 0.20 | 0.20 | 0.20 |
| Ratio Lr/P | 1.66 | 1.66 | 2.67 | 2.67 |
| Ratio LH/SH | 0.30 | 0.30 | 0.30 | 0.30 |
| Angle θr (°) | 0 | 0 | 0 | 0 |
| Wax coatability | 100 | 100 | 100 | 100 |
| Wax durability | 120 | 110 | 120 | 115 |

TABLE 4

| | Example 21 | Example 22 | Example 23 | Example 24 |
|---|---|---|---|---|
| Ridge pitch length P (mm) | 0.55 | 0.55 | 1.40 | 1.40 |
| Ridge height h (mm) | 0.60 | 0.60 | 0.82 | 0.91 |
| Ratio h/b | 1.33 | 1.36 | 1.04 | 1.08 |
| Ratio a/P | 0.20 | 0.22 | 0.25 | 0.25 |
| Ratio c/P | 0.17 | 0.20 | 0.44 | 0.40 |
| Ridge wall angle θ (°) | 16 | 15 | 15 | 15 |
| H-h (mm) | 0.20 | 0.15 | 0.20 | 0.20 |
| Ratio Lr/P | 2.64 | 2.67 | 1.90 | 2.00 |
| Ratio LH/SH | 0.30 | 0.30 | 0.30 | 0.30 |
| Angle θr (°) | 0 | 0 | 0 | 0 |
| Wax coatability | 100 | 100 | 95 | 100 |
| Wax durability | 110 | 110 | 115 | 115 |

| | Example 25 | Example 26 | Example 27 | Example 28 |
|---|---|---|---|---|
| Ridge pitch length P (mm) | 1.40 | 1.40 | 0.55 | 0.55 |
| Ridge height h (mm) | 1.37 | 1.82 | 0.50 | 0.91 |
| Ratio h/b | 1.27 | 1.37 | 1.19 | 1.19 |

TABLE 4-continued

| | | | | |
|---|---|---|---|---|
| Ratio a/P | 0.25 | 0.25 | 0.27 | 0.27 |
| Ratio c/P | 0.23 | 0.05 | 0.00 | 0.00 |
| Ridge wail angle θ (°) | 15 | 15 | 15 | 15 |
| H-h (mm) | 0.20 | 0.20 | 0.20 | 0.20 |
| Ratio Lr/P | 2.50 | 3.00 | 2.16 | 2.16 |
| Ratio LH/SH | 0.30 | 0.30 | 0.2 | 0.3 |
| Angle θr (°) | 0 | 0 | 0 | 0 |
| Wax coatability | 100 | 100 | 100 | 105 |
| Wax durability | 114 | 110 | 110 | 112 |

TABLE 5

| | Example 29 | Example 30 | Example 31 | Example 32 |
|---|---|---|---|---|
| Ridge pitch length P (mm) | 0.55 | 0.55 | 0.55 | 0.55 |
| Ridge height h (mm) | 0.50 | 0.50 | 0.50 | 0.50 |
| Ratio h/b | 1.19 | 1.19 | 1.19 | 1.19 |
| Ratio a/P | 0.27 | 0.27 | 0.27 | 0.27 |
| Ratio c/P | 0.00 | 0.00 | 0.00 | 0.00 |
| Ridge wall angle θ (°) | 15 | 15 | 15 | 15 |
| H-h (mm) | 0.20 | 0.20 | 0.20 | 0.20 |
| Ratio Lr/P | 2.16 | 2.16 | 2.16 | 2.16 |
| Ratio LH/SH | 0.4 | 0.5 | 0.30 | 0.30 |
| Angle θr (°) | 0 | 0 | 10 | 20 |
| Wax coatability | 110 | 115 | 105 | 105 |
| Wax durability | 114 | 116 | 112 | 112 |

| | Example 33 | Example 34 | Example 35 | Example 36 | Example 37 |
|---|---|---|---|---|---|
| Ridge pitch length P (mm) | 0.55 | 0.55 | 0.55 | 0.55 | 0.55 |
| Ridge height h (mm) | 0.50 | 0.50 | 0.50 | 0.50 | 0.50 |
| Ratio h/b | 1.19 | 1.19 | 1.19 | 1.19 | 1.19 |
| Ratio a/P | 0.27 | 0.27 | 0.27 | 0.27 | 0.27 |
| Ratio c/P | 0.00 | 0.00 | 0.00 | 0.00 | 0.00 |
| Ridge wall angle θ (°) | 15 | 15 | 15 | 15 | 15 |
| H-h (mm) | 0.20 | 0.20 | 0.20 | 0.20 | 0.20 |
| Ratio Lr/P | 2.16 | 2.16 | 2.16 | 2.16 | 2.16 |
| Ratio LH/SH | 0.30 | 0.30 | 0.30 | 0.30 | 0.30 |
| Angle θr (°) | 30 | 40 | 50 | 58 | 60 |
| Wax coatability | 105 | 105 | 105 | 105 | 103 |
| Wax durability | 112 | 112 | 112 | 112 | 110 |

The invention claimed is:

1. A pneumatic tire, comprising:

a tread portion;

a tire side portion; and a bead portion;

a ridge region being provided in a predetermined region of the tire side portion, the ridge region being formed with a plurality of ridges arranged, the plurality of ridges periodically protruding from a base surface in parallel to each other, and a pitch length between the ridges that are adjacent in a cross-sectional view of the plurality of ridges along an orthogonal direction, which is a direction orthogonal to an extension direction, being 0.52 mm or more and 1.50 mm or less, and a ratio of a height to a width of one of the ridges along the orthogonal direction being 0.60 or more and 1.40 or less, wherein a flat portion is provided between the ridges that are adjacent in a cross-sectional view of the plurality of ridges along the orthogonal direction, and a ratio of a width of the flat portion along the orthogonal direction to the pitch length is 0 or more and 0.20 or less, the ridges each include a wall surface from the top portion toward the flat portion, and an angle of the wall surface with respect to a perpendicular line drawn from a tire profile line toward the base surface in a cross-sectional view along the orthogonal direction is 15° or less, the ridge region is located on an outer side in a tire radial direction from a tire maximum width position, ridge walls defining both sides of each of the plurality of ridges extend parallel to one another from one end to an opposite end, extending parallel defining that the ridge walls are provided side by side without intersecting each other, and a ratio of a continuous extension length of the plurality of ridges in the tire radial direction to a tire cross-sectional height is 0.3 or more.

2. The pneumatic tire according to claim 1, wherein the height of the one of the ridges is 0.50 mm or more and 1.00 mm or less.

3. The pneumatic tire according to claim 2, wherein top portions of the plurality of ridges each include a flat surface portion, and a ratio of a width of the flat surface portion of each of the top portions along the orthogonal direction to the pitch length is 0.10 or more and 0.30 or less.

4. The pneumatic tire according to claim 3, wherein one end portion of each of the plurality of ridges in the extension direction is in contact with a wall portion, a height of the wall portion is greater than a height of each of the plurality of ridges, and a difference between the height of each of the plurality of ridges and the height of the wall portion is 0.20 mm or more.

5. The pneumatic tire according to claim 4, wherein a ratio of a length along a contour of each of the ridges per cycle in a cross-sectional view of the plurality of ridges along the orthogonal direction to the pitch length is 2.0 or more and 3.0 or less.

6. The pneumatic tire according to claim 5, wherein an angle of each of the plurality of ridges in the extension direction with respect to the tire radial direction is 0° or more and 58° or less.

7. The pneumatic tire according to claim 1, wherein top portions of the plurality of ridges each include a flat surface portion, and a ratio of a width of the flat surface portion of each of the top portions along the orthogonal direction to the pitch length is 0.10 or more and 0.30 or less.

8. The pneumatic tire according to claim 1, wherein one end portion of each of the plurality of ridges in the extension direction is in contact with a wall portion, a height of the wall portion is greater than a height of each of the plurality of ridges, and a difference between the height of each of the plurality of ridges and the height of the wall portion is 0.20 mm or more.

9. The pneumatic tire according to claim 1, wherein a ratio of a length along a contour of each of the ridges per cycle in a cross-sectional view of the plurality of ridges along the orthogonal direction to the pitch length is 2.0 or more and 3.0 or less.

10. The pneumatic tire according to claim 1, wherein an angle of each of the plurality of ridges in the extension direction with respect to the tire radial direction is 0° or more and 58° or less.

11. The pneumatic tire according to claim 1, wherein the ratio of the continuous extension length of the plurality of ridges in the tire radial direction to the tire cross-sectional height is 0.4 or more.

12. The pneumatic tire according to claim 1, wherein the ratio of the continuous extension length of the plurality of ridges in the tire radial direction to the tire cross-sectional height is 0.5 or more.

13. The pneumatic tire according to claim 1, wherein a whole of the ridge region is located on the outer side in the tire radial direction from the tire maximum width position.

14. A pneumatic tire, comprising:

a tread portion;

a tire side portion; and a bead portion;

a ridge region being provided in a predetermined region of the tire side portion, the ridge region being formed with a plurality of ridges arranged, the plurality of ridges periodically protruding from a base surface in parallel to each other, and a pitch length between the ridges that are adjacent in a cross-sectional view of the plurality of ridges along an orthogonal direction, which is a direction orthogonal to an extension direction, being 0.52 mm or more and 1.50 mm or less, and a ratio of a height to a width of one of the ridges along the orthogonal direction being 0.60 or more and 1.40 or less, wherein a ratio of a length along a contour of each of the ridges per cycle in a cross-sectional view of the plurality of ridges along the orthogonal direction to the pitch length is 2.0 or more and 3.0 or less, the ridge region is located on an outer side in a tire radial direction from a tire maximum width position, ridge walls defining both sides of each of the plurality of ridges extend parallel to one another from one end to an opposite end, extending parallel defining that the ridge walls are provided side by side without intersecting each other, and a ratio of a continuous extension length of the plurality of ridges in the tire radial direction to a tire cross-sectional height is 0.3 or more.

15. The pneumatic tire according to claim 14, wherein the ratio of the continuous extension length of the plurality of ridges in the tire radial direction to the tire cross-sectional height is 0.4 or more.

16. The pneumatic tire according to claim 14, wherein the ratio of the continuous extension length of the plurality of ridges in the tire radial direction to the tire cross-sectional height is 0.5 or more.

17. The pneumatic tire according to claim 14, wherein a whole of the ridge region is located on the outer side in the tire radial direction from the tire maximum width position.

* * * * *